June 16, 1953
A. STEITZ, JR., ET AL
2,642,388
DISTILLATION OF AMYL ALCOHOLS FROM
KETONE-CONTAINING MIXTURES
Filed Dec. 30, 1950
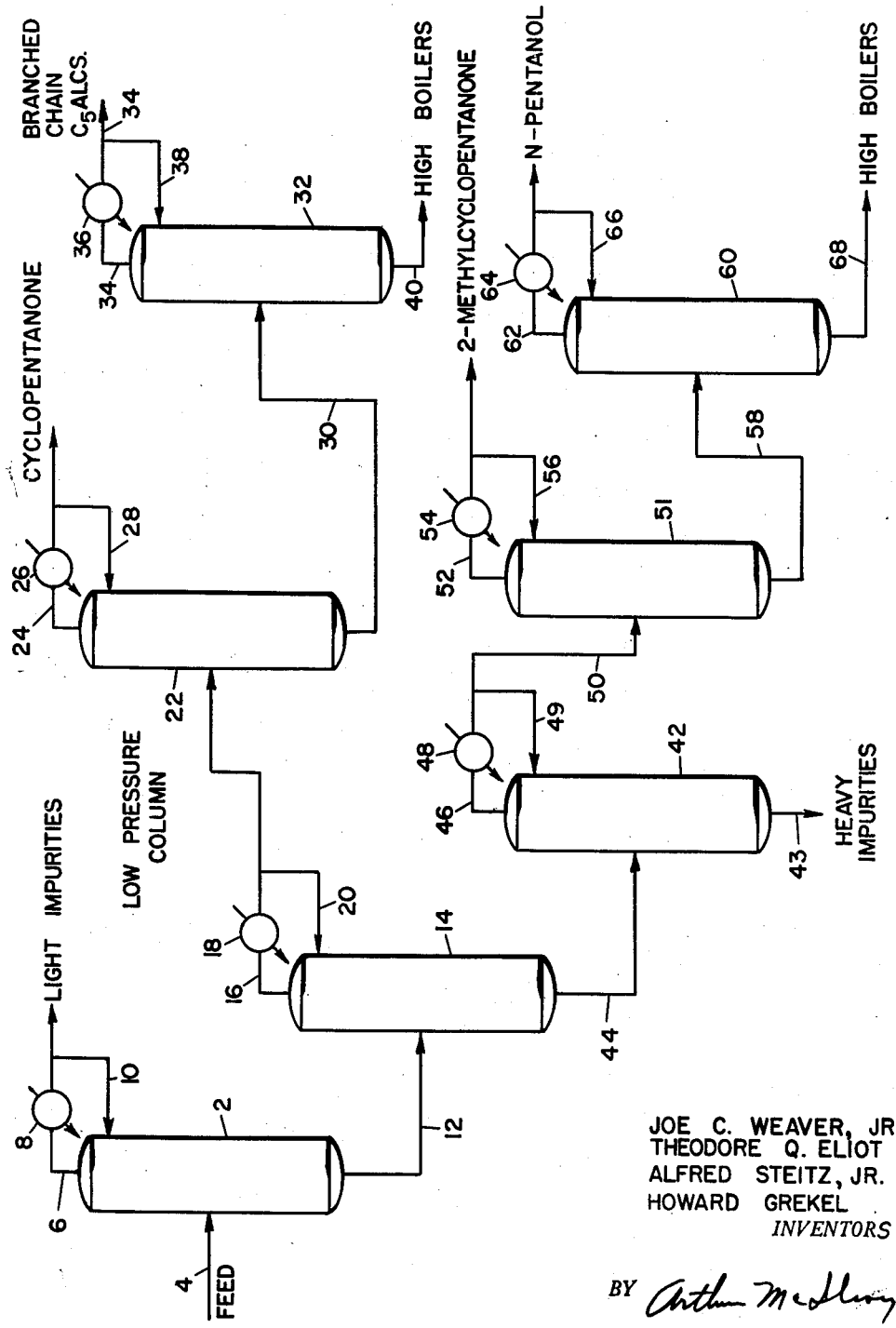
JOE C. WEAVER, JR.
THEODORE Q. ELIOT
ALFRED STEITZ, JR.
HOWARD GREKEL
*INVENTORS*
BY Arthur M...
*ATTORNEY*

Patented June 16, 1953

2,642,388

UNITED STATES PATENT OFFICE 2,642,388

DISTILLATION OF AMYL ALCOHOLS FROM KETONE-CONTAINING MIXTURES

Alfred Steitz, Jr., Howard Grekel, and Theodore Q. Eliot, Tulsa, Okla., and Joe C. Weaver, Jr., Brownsville, Tex., assignors to Stanolind Oil and Gas Company, Tulsa, Okla., a corporation of Delaware Application December 30, 1950, Serial No. 203,717

9 Claims. (Cl. 202—42)

The present invention relates to a novel method for the separation of alcohols from mixtures thereof containing ketones which either azeotrope with or which boil close to the boiling point of such alcohols. More particularly, it pertains to a method for separating various of the amyl alcohols from ketones which either azeotrope therewith such as, for example, cyclopentanone and methylcyclopentanone, or which boil so close to the boiling point of said various amyl alcohols that separation by means of straight fractional distillation is impossible.

Mixtures containing n-pentanol, 2-methyl-1-butanol and 3-methyl-1-butanol or at least one of these alcohols together with at least one of the aforesaid ketones cannot be satisfactorily separated by means of ordinary fractional distillation methods owing to the fact that 2-methyl-1-butanol and 3-methyl-1-butanol, which boil at 128.9° C. and 132° C. respectively, form azeotropes with cyclopentanone (B. P. 130.7° C.) boiling at approximately 127.0° C. and 129.5° C. respectively, while 2-methylcyclopentanone, which boils at 138–139° C., cannot be separated from n-pentanol boiling at 138.0° C. Although the problem of separating various of the above-mentioned amyl alcohols from cyclopentanone or 2-methylcyclopentanone occurs in numerous purification procedures, one of the principal instances where an efficient method for the separation of these compounds is most urgently needed is in their recovery, along with other chemicals, from both the water and oil fractions produced by the reduction of carbon monoxide with hydrogen in the presence of a fluidized alkali-promoted iron catalyst under known synthesis conditions. The magnitude of this problem may be more fully appreciated when it is realized that in hydrocarbon synthesis plants designed for commercial operation and having a capacity of about 6,000 bbls. per day of liquid hydrocarbons, there are produced in the water stream alone approximately 4200 lbs. of amyl alcohols per day and about 1000 lbs. per day of cyclopentanone and 2-methylcyclopentanone. Both classes of these compounds are found in the oil stream in even greater amounts than they normally occur in the aqueous fraction. Specifically, mixtures of these alcohols and ketones obtained from the water stream usually contain from about 12 to 15 per cent cyclopentanone, 6 to 10 per cent 2-methylcyclopentanone, 40 to 50 per cent n-pentanol, 7 to 10 per cent 2-methyl-1-butanol, and 8 to 11 per cent 3-methyl-1-butanol together with about 20 to 25 per cent of a high-boiling residue, 40 to 50 per cent of which consists of various carbonyl fractions. Mixtures of this type can generally be separated initially into three fractions, i. e., (1) a portion consisting chiefly of 2-methyl-1-butanol, 3-methyl-1-butanol and cyclopentanone, (2) a fraction of n-pentanol and 2-methylcyclopentanone, and (3) a fraction consisting of compounds boiling above about 137–140° C. Further distillation of the first two fractions is ineffective to separate the components thereof owing to the fact that azeotropes are formed in each instance.

Attempts have previously been made to separate the above-mentioned amyl alcohols from one another and from the aforesaid ketones by distilling the crude mixture containing these alcohols and ketones up to a temperature of about 87° C. Thereafter, a second fraction boiling from about 87° C. to about 138° C. was collected, after which the resulting distillate was azeotropically distilled with water until the overhead being obtained was substantially free of ketones. Distillation of the mixture under such conditions yielded a bottoms of n-pentanol and an overhead fraction containing 2-methyl-1-butanol and 3-methyl-1-butanol, cyclopentanone, 2-methylcyclopentanone, and a small amount of n-pentanol. This overhead fraction was distilled until all of the water had been removed, after which the resulting dry mixture of alcohols and ketones was subjected to distillation under a pressure of about 40 mm. By this operation, however, a sizeable fraction boiling from about 54° C. to about 62° C. was obtained which contained the bulk of the 2-methyl-1-butanol and the 3-methyl-1-butanol together with a large portion of both ketones which passed overhead along with the alcohols. In order to effect a separation between these alcohols and ketones, the distillate collected at 54° C. to 62° C. (40 mm.) was subjected to distillation at atmospheric pressure whereby there were obtained two overhead fractions; one boiling at 130° C. and the other boiling at about 138° C. to 140° C. The bottoms fraction was relatively small and consisted essentially of high-boiling ketone polymers. The aforesaid fraction boiling at about 130° C. contained approximately 90 per cent alcohols (2-methyl-1-butanol and 3-methyl-1-butanol) but was still contaminated with about 10 per cent ketones, whereas approximately 75 per cent of the 2-methylcyclopentanone was obtained in a relatively pure condition in the fraction boiling at 138° C. to 140° C. The above procedure suffers several serious disadvantages. Because of the large number of repeated distillations, considerably mechanical losses of materials occur, and the heat-sensitive ketones are polymerized. In addition, a large amount of high-vacuum distillation equipment is necessary, since all the "iso" C₅ alcohols and both cyclic ketones must be distilled at about 40 mm. Finally, the separation does not completely resolve the mixture, since a final fraction is obtained at 130° C. (760 mm.) which contains appreciable amounts of both iso-alcohols and 2-methylcyclopentanone.

Accordingly, it is an object of our invention to provide a simplified and efficient method for separating the aforesaid isomeric amyl alcohols from ketones such as, for example, cyclopentanone and 2-methylcyclopentanone. It is a further object of our invention to provide a method whereby said alcohols and ketones can be readily separated from one another and recovered in substantially pure form. It is a still further object of our invention to provide a process for the separation of n-pentanol, 2-methyl-1-butanol and 3-methyl-1-butanol from mixtures of these alcohols together with ketones, at least some of which azeotrope with n-pentanol and some of which azeotrope with 2-methyl-1-butanol and 3-methyl-1-butanol, by first distilling such mixtures up to a temperature of about 121° C. in order to remove light impurities therefrom, thereafter subjecting the resulting residue to distillation and collecting separate fractions boiling from about 121° C. to about 134° C. and from about 134° C. to about 140° C. respectively. The desired alcohols may then be recovered from the aforesaid fractions by subjecting the latter to separate distillation operations under reduced pressure.

We have now discovered that the foregoing disadvantages in the previous methods for effecting the aforesaid separation can be avoided and that each of the desired components in the mixtures of the type mentioned above can be recovered in a state of high purity. In accordance with our invention, separation of the components of such mixtures is accomplished by first fractionating the crude stream into carefully selected cuts followed by vacuum distillation of each alcohol-rich cut (both normal and branched-chain C₅ alcohols) to individually separate the contaminating ketones from the alcohols. It has been our experience that the selection of these cut-points is critical and that efficient fractionation at this stage is highly desirable in order to avoid contamination of the principal products during subsequent vacuum distillation steps. We have found that the fraction containing the C₅ branched-chain alcohols with which we are concerned (2-methyl-1-butanol and 3-methyl-1-butanol) boils from about 121° C. to about 132-134° C. while the n-pentanol cut boils from about 132-134° C. to about 138-139° C. In this connection, it is to be pointed out that not only is it necessary to separate the branched-chain alcohols from the n-pentanol but that it is essential that the light contaminants, i. e., n-butanol and heavy ends, such as the various hexanols and relatively high-boiling ketones, be eliminated in the fractionation steps prior to vacuum distillation operations.

In carrying out the process of our invention, a mixture of the crude C₅ alcohols contaminated with close-boiling ketones and having a composition similar to that generally outlined above is first subjected to distillation in order to remove therefrom objectionable light ends boiling up to about 121° C. The residue of the foregoing operation is then separated into two fractions by first subjecting the mixture to distillation over a temperature range of from about 121° C. to about 134° C. The resulting overhead which consists of branched-chain amyl alcohols and cyclopentanone is next distilled under reduced pressure yielding a distillate of substantially pure cyclopentanone. This operation is generally preferably carried out under pressures of the order of from about 40 mm. to about 200 mm. Pressures below 40 mm., of course, may be utilized. However, from the standpoint of economic considerations, operation at levels below 40 mm. is ordinarily not considered desirable. The bottoms fraction obtained by this distillation under reduced pressure consists of substantially pure branched-chain C₅ alcohols.

The bottoms fraction obtained by distillation of the original crude mixture up to a temperature of about 134° C. consists essentially of n-pentanol and 2-methylcyclopentanone together with heavy impurities. This fraction is further distilled over a temperature range of from about 134° C. up to about 138-139° C. In this manner, the heavy impurities are separated as bottoms while the overhead fraction which contains the n-pentanol and 2-methylcyclopentanone is thereafter subjected to vacuum distillation under pressures ranging from about 40 mm. to about 150 mm. Here again, it will, of course, be appreciated that such distillation operations may be effected at pressures below 40 mm. However, the costs entailed in operating under such conditions are generally uneconomical. In the majority of instances, pressures in the neighborhood of 100 mm. are generally considered preferable when separating cyclopentanone from the two branched-chain C₅ alcohols and 2-methylcyclopentanone from n-pentanol. Vacuum distillation of the aforesaid cut boiling from 134° C. to 138-139° C. results in the procurement of an overhead of substantially pure 2-methylcyclopentanone. The bottoms thus obtained consists predominantly of n-pentanol and may be further purified by additional fractionation at atmospheric or reduced pressures. Frequently, this last distillation step is considered desirable, both in the case of the two branched-chain alcohols and n-pentanol, because of the accumulation of relatively high-boiling polymeric materials resulting from continued heating of the ketone compounds present at various stages throughout the process.

The process of our invention is further illustrated by the following specific example in which a higher alcohols fraction obtained from a plant processing water-soluble chemicals produced in hydrocarbon synthesis is employed as the initial feed.

*Example*

A crude aqueous mixture of higher alcohols having the following composition was selected to be refined in accordance with the invention described above.

| Component: | Weight per cent (dry basis) |
|---|---|
| n-Butanol | 5 |
| 2-methyl-1-butanol | 8 |
| 3-methyl-1-butanol | 6 |
| Cyclopentanone | 11 |
| 2-methylcyclopentanone | 7 |
| n-Pentanol | 40 |
| Fraction boiling above 140° C. (760 mm.) | 23 |
| | 100 |

The above mixture was distilled at atmospheric pressure into four fractions, the first constituting that portion of the mixture boiling up to about 121° C., the second fraction being collected from about 121° C. to about 134° C., and the third fraction being collected from about 134° C. to about 138° C., leaving a residue of heavy ends which was discarded along with the first fraction boiling up to 121° C. The 121–134° C. fraction contained the branched-chain alcohols and cyclopentanone. This latter fraction amounted to 506 parts and consisted of 45.7 weight per cent cyclopentanone and 54.3 weight per cent of a mixture of 2-methyl-1-butanol and 3-methyl-1-butanol. On careful distillation of this fraction under a pressure of 40 mm., an overhead was collected boiling at 49.5–51.0° C. amounting to 193 parts and consisting of 95.5 weight per cent cyclopentanone. An intermediate slop cut boiling at 51–62° C./40 mm. was collected and amounted to 50 parts. Analysis of this cut indicated its composition to be 72 weight per cent cyclopentanone and 28 weight per cent branched-chain alcohols. A third fraction was next collected boiling at 62–63° C./40 mm. amounting to 253 parts, of which 99.6 weight per cent was branched-chain $C_5$ alcohols. The quantity of material boiling above 63° C./40 mm. amounted to 10 parts.

The fraction obtained by distillation of the original mixture at 134–138° C. and which consisted essentially of n-pentanol and 3-methylcyclopentanone (approximately 12.1 weight per cent of the latter) was carefully distilled under a pressure of 40 mm. This fraction amounted to 975 parts. Distillation resulted in the recovery of 69 weight per cent of the n-pentanol contained in the original charge as pure carbonyl-free material boiling at 68° C./40 mm. Sixty-four weight per cent of the 2-methylcyclopentanone was separately recovered as distillate and had a maximum purity of approximately 90 per cent. There resulted a substantial quantity of high-boiling residue, a principal portion of which probably consisted of high-boiling ketone polymers.

The process of our invention is further illustrated by the accompanying flow diagram in which a crude mixture of both normal and branched-chain $C_5$ alcohols derived from the separation of n-butanol and lighter alcohols present in the hydrocarbon synthesis product-water stream is introduced at an intermediate point in column 2 through line 4. Column 2 is operated so as to distill overhead light impurities boiling up to 121° C. These impurities are withdrawn through line 6 and condenser 8 while a portion of this stream is returned to the column through line 10. After low-boiling impurities have been removed in this manner, the residue thus obtained is withdrawn from column 2 through line 12 and passes into column 14 where a fraction boiling up to about 134° C. is taken overhead through line 16 and condenser 18. Part of the stream thus removed from column 14 is returned thereto via line 20, but the remainder passes into low-pressure column 22. In this column which is operated at about 100 mm., cyclopentanone having a purity of 95.5 per cent is brought overhead through line 24 and condenser 26 at a temperature of about 72° C., a portion of the stream being returned to the column as reflux through line 28. The bottoms fraction obtained by this operation is withdrawn through line 30 and fed to column 32. This column may, if desired, be operated at atmospheric pressure; however, in order to insure the recovery of $C_5$ alcohols of high purity, we generally prefer to carry out this operation at a pressure of about 100 mm. When operating at reduced pressures, it may be desirable to take overhead a small fraction consisting of a ketone-alcohol mixture. Under such conditions, the major alcohol product stream is withdrawn as a side cut. On distillation of the mixture introduced into the column through line 30, 2-methyl-1-butanol and 3-methyl-1-butanol leave column 32 through line 34 and condenser 36. The product collected boils at about 81° C./100 mm. and consists of 99.6 weight per cent of the aforesaid alcohols. In order to improve the efficiency of this operation, a portion of the stream brought overhead is returned to column 32 as reflux through line 38. High-boiling residues are withdrawn from the column through line 40.

The bottoms fraction obtained by the operation of column 14 contains n-pentanol and 2-methylcyclopentanone together with heavy impurities and is transferred to fractionating column 42 through line 44. Within column 42, the n-pentanol and 2-methylcyclopentanone are separated from heavy impurities by taking the alcohol and ketone overhead through line 46 and condenser 48. The bottoms fraction of heavy impurities is withdrawn through line 43. Operation of column 42 is carried out so as to distill overhead all components of the mixture boiling up to about 139° C. A portion of the distillate withdrawn under these conditions is returned to the column as reflux through line 49. The overhead from column 42 is introduced into low-pressure column 51 through line 50. In this column, which is operated at a pressure of about 100 mm., 2-methylcyclopentanone having a purity of about 90 per cent is withdrawn through line 52 and condenser 54 at a temperature of about 81° C., a portion of this stream being returned to the column as reflux through line 56. As previously mentioned, column 48 may be conveniently operated at pressures ranging from about 40 mm. to about 150 mm. Lower pressures than 40 mm. may, of course, be employed; however, because of economic considerations, it is generally considered inadvisable to carry out such operation substantially below 40 mm. The bottoms fraction obtained by operation of column 48 is withdrawn through line 58 and consists of n-pentanol together with a minor amount of relatively high-boiling impurities composed chiefly of various ketone polymers. This stream is introduced at an intermediate point into column 60 which may be operated at atmospheric or reduced pressures. Pure carbonyl-free n-pentanol leaves column 60 through line 62 and condenser 64. A portion of this stream is recycled to column 60 through line 66 as reflux in order to insure high purity of the overhead product. The bottoms fraction which consists essentially of a high-boiling ketone polymer residue is withdrawn and discarded through line 68. When operating column 60 at reduced pressures, it may be found desirable to take overhead a small fraction consisting of a ketone alcohol mixture. Under such conditions, the major alcohol product stream is withdrawn as a side cut.

While the foregoing example and flow diagram illustrate advantageous embodiments of our invention, it is to be understood that the scope thereof is not necessarily limited thereto. On the contrary, our invention is to be construed broadly with respect to the present description and claims; and, in general, it is to be understood that any modification or equivalents which would naturally occur to those skilled in the art are to be considered as lying within the scope of our invention.

Throughout the present description and claims, all boiling points referred to are the boiling points of the materials mentioned at atmospheric pressure unless otherwise indicated. Also, the expression "close-boiling ketones," as used herein, is intended to include both ketones which azeotrope with the alcohol or alcohols concerned or which boil so close thereto that separation of the alcohol or alcohols therefrom cannot be effected by ordinary distillation techniques.

What we claim is:

1. In a process for the recovery of n-pentanol, 2-methyl-1-butanol and 3-methyl-1-butanol from mixtures containing close-boiling ketones, the steps which comprise subjecting said mixture to fractional distillation, collecting a first fraction boiling from about 121° C. to about 132–134° C., collecting a second fraction boiling from about 134° C. to 138–139° C., and separately distilling said first and second fractions at temperatures and pressures not substantially in excess of about 91° C. and 200 mm. and about 90° C. and 150 mm. respectively.

2. In a process for the recovery of n-pentanol, 2-methyl-1-butanol and 3-methyl-1-butanol from mixtures containing close-boiling ketones, the steps which comprise subjecting said mixture to fractional distillation, collecting a first fraction boiling from about 121° C. to about 132–134° C., separately distilling said first and second fractions at temperatures and pressures not substantially in excess of about 91° C. and 200 mm. and about 90° C. and 150 mm. respectively, distilling the bottoms from the distillation of said first fraction at temperatures and pressures not substantially in excess of about 130–131° C. and 760 mm. to obtain an overhead consisting essentially of substantially pure 2-methyl-1-butanol and 3-methyl-1-butanol, and distilling the bottoms from the distillation of said second fraction at temperatures and pressures not substantially in excess of about 138° C. and 760 mm. to obtain an overhead consisting essentially of substantially pure n-pentanol.

3. In a process for the recovery of 2-methyl-1-butanol and 3-methyl-1-butanol from mixtures containing n-pentanol and close-boiling ketones, the steps which comprise subjecting said mixture to distillation, collecting a fraction boiling from about 121° C. to about 132–134° C., distilling said fraction at temperatures and pressures not substantially in excess of about 91° C. and 200 mm., and thereafter distilling the bottoms from the distillation of said fraction at temperatures and pressures not substantially in excess of about 130–131° C. and 760 mm. to obtain an overhead consisting essentially of substantially pure 2-methyl-1-butanol and 3-methyl-1-butanol.

4. In a process for the recovery of n-pentanol from mixtures containing 2-methyl-1-butanol, 3-methyl-1-butanol and close-boiling ketones, the steps which comprise isolating a fraction boiling from about 134° C. to about 138–139° C., subjecting said fraction to distillation at temperatures and pressures not substantially in excess of about 90° C. and 150 mm., and thereafter distilling the bottoms from the distillation of said fraction at temperatures and pressures not substantially in excess of about 138° C. and 760 mm. to obtain an overhead consisting essentially of substantially pure n-pentanol.

5. In a process for the recovery of n-pentanol, 2-methyl-1-butanol and 3-methyl-1-butanol from mixtures containing close-boiling ketones including cyclopentanone and 2-methylcyclopentanone, the steps which comprise subjecting said mixture to fractional distillation, collecting a first fraction boiling from about 121° C. to about 132–134° C., withdrawing a second fraction boiling from about 134° C. to about 138–139° C., separately distilling said first and second fractions at temperatures and pressures not substantially in excess of 91° C. and 200 mm. and 90° C. and 150 mm. respectively, and distilling the bottoms from the distillation of said first fraction at temperatures and pressures not in substantial excess of about 130–131° C. and 200 mm. to obtain an overhead consisting essentially of a mixture of substantially pure 2-methyl-1-butanol and 3-methyl-1-butanol.

6. In a process for the recovery of n-pentanol, 2-methyl-1-butanol and 3-methyl-1-butanol from a crude mixture thereof derived from the separation of n-butanol and lighter alcohols present in the product stream formed during the synthesis of hydrocarbons by the reduction of carbon monoxide with hydrogen and wherein said crude mixture contains close-boiling ketones, the steps which comprise subjecting said mixture to fractional distillation, collecting a first fraction boiling from about 121° C. to 132–134° C., withdrawing a second fraction boiling from about 134° C. to about 138–139° C., and separately distilling said first and second fractions at temperatures and pressures not in substantial excess of about 91° C. and 200 mm. and about 90° C. and 150 mm. respectively.

7. In a process for the recovery of n-pentanol, 2-methyl-1-butanol and 3-methyl-1-butanol from mixtures containing close-boiling ketones including cyclopentanone and 2-methylcyclopentanone, the steps which comprise subjecting said mixture to fractional distillation, collecting a fraction boiling from about 121° C. to about 132–134° C., subjecting said fraction to distillation at temperatures and pressures not in substantial excess of 91° C. and 200 mm., and withdrawing an overhead stream of substantially pure cyclopentanone.

8. The process of claim 1 in which the mixture being distilled contains from about 12 to 15 per cent cyclopentanone, 6 to 10 per cent 2-methylcyclopentanone, 40 to 50 per cent n-pentanol, 7 to 10 per cent 2-methyl-1-butanol, and 8 to 11 per cent 3-methyl-1-butanol.

9. The process of claim 2 in which the mixture being distilled contains from about 12 to 15 per cent cyclopentanone, 6 to 10 per cent 2-methylcyclopentanone, 40 to 50 per cent n-pentanol, 7 to 10 per cent 2-methyl-1-butanol, and 8 to 11 per cent 3-methyl-1-butanol.

ALFRED STEITZ, Jr.
HOWARD GREKEL.
THEODORE Q. ELIOT.
JOE C. WEAVER, Jr.

References Cited in the file of this patent

UNITED STATES PATENTS

| Number | Name | Date |
|---|---|---|
| 2,324,255 | Britton et al. | July 13, 1943 |